United States Patent [19]

Celada et al.

[11] 3,770,421
[45] Nov. 6, 1973

[54] METHOD AND APPARATUS FOR CONTROLLING THE COMPOSITION OF A REDUCING GAS USED TO REDUCE METAL ORES

[75] Inventors: Juan Celada; Patrick W. MacKay; Gilberto Guerra Garcia; Enrique R. Martinez; Antonio Villasenor, all of Monterrey, N.L., Mexico

[73] Assignee: Fierro Esponja, S.A., Monterrey, Mexico

[22] Filed: Nov. 22, 1971

[21] Appl. No.: 200,721

[52] U.S. Cl. ............................... 75/91, 75/26, 75/34, 75/35
[51] Int. Cl. .................. C22b 5/12, C21b 13/14
[58] Field of Search .................. 75/91, 26, 34, 35

[56] References Cited
UNITED STATES PATENTS

| | | | |
|---|---|---|---|
| 2,900,247 | 8/1959 | Celada | 75/34 |
| 3,189,438 | 6/1965 | Von Bogdandy | 75/34 |
| 3,423,201 | 1/1969 | Celada | 75/26 |
| 2,915,379 | 12/1959 | Agarual | 75/26 |
| 2,807,535 | 9/1957 | Segre | 75/35 |
| 2,635,957 | 4/1953 | Kalling | 75/34 |
| 3,128,174 | 4/1964 | Celada | 75/34 |
| 1,401,222 | 12/1921 | Wiberg | 75/35 |

Primary Examiner—L. Dewayne Rutledge
Assistant Examiner—Peter D. Rosenberg
Attorney—A. Thomas S. Safford et al.

[57] ABSTRACT

Apparatus and method are described for controlling the addition of steam to recycled gas circulating in a closed loop including the reduction zone of a reactor and a catalytic reformer of a system for gaseous reduction of particulate metal ores to metal wherein the recycled gas is measured to determine flow rate and gaseous composition and the measurements are utilized in an electronic circuit to generate an input signal for a steam controller.

14 Claims, 4 Drawing Figures

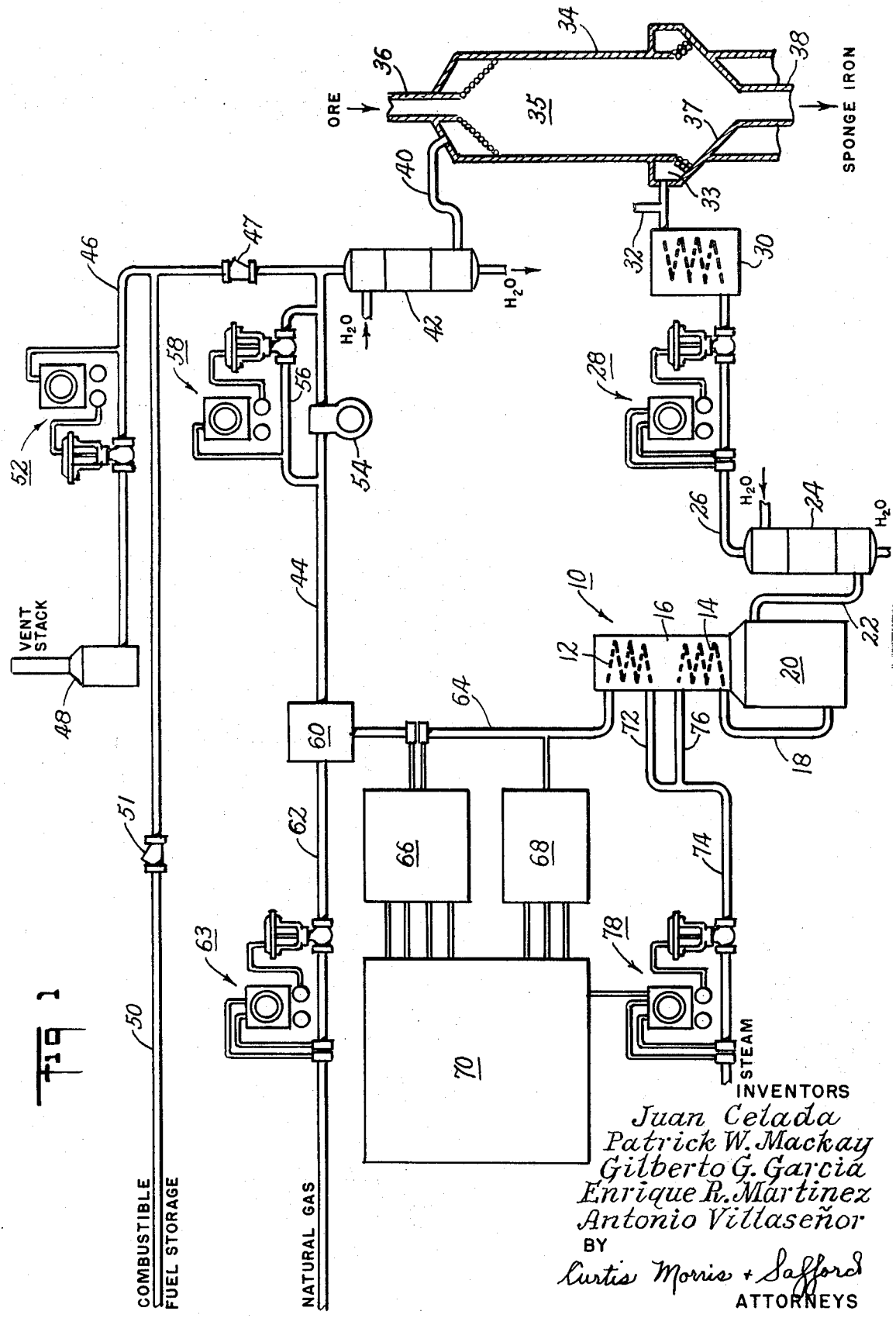

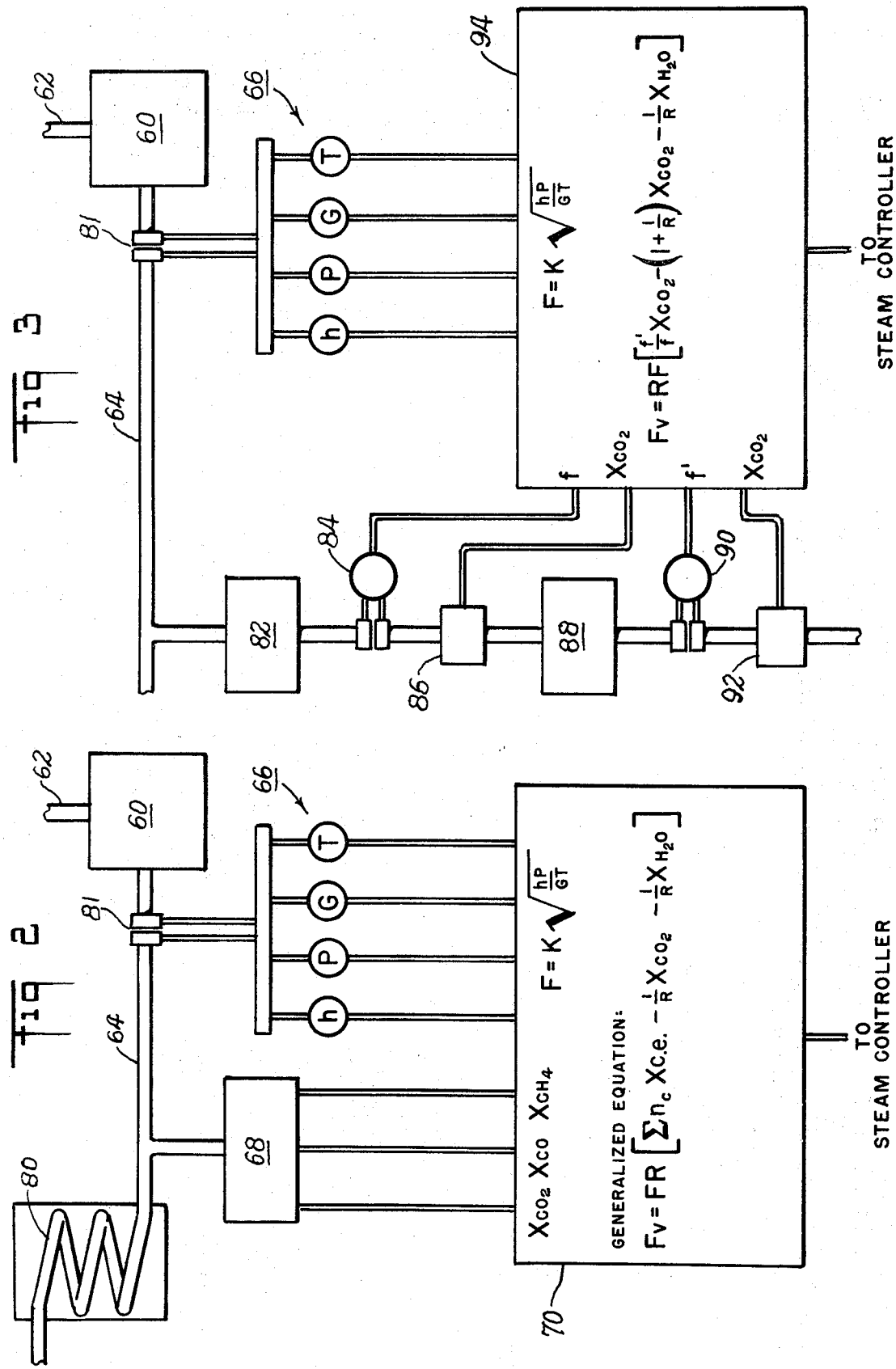

METHOD AND APPARATUS FOR CONTROLLING THE COMPOSITION OF A REDUCING GAS USED TO REDUCE METAL ORES

This invention relates to the gaseous reduction of particulate metal ores to metal in a system of the type in which the reducing gas is generated in a catalytic reformer and passed through a body of the metal ore in a reduction reactor. More particularly, the invention relates to a method and apparatus for recirculating the reducing gas through the reformer, adding a hydrocarbon gas and steam to the circulating gas before it enters the reformer and automatically regulating the rate of addition of steam to the circulating gas, including the added hydrocarbon gas, to produce a reformer outlet gas that contains a high proportion of carbon monoxide and hydrogen while avoiding deposition of carbon on the catalyst in the reformer. In the following description, the method and apparatus are illustratively described as applied to a system for the reduction of iron ore to sponge iron. However, as the description proceeds, it will be evident to those skilled in the art that the invention also is applicable to the control of steam in the treatment of other ores.

In the production of sponge iron in a vertical-shaft moving or fixed bed reactor, a suitably heated reducing gas, typically a gas largely composed of carbon monoxide and hydrogen, is introduced into the reactor at temperatures of the order of 850° to 1,100°C, preferably 900° to 1,100°C and caused to flow through a body of ore in the reactor to reduce the ore therein. In a number of the previously proposed processes, a major portion of the spent reducing gas is either vented to the atmosphere or directed to a combustible fuel storage. A copending U.S. application, Ser. No. 98,612 filed on Dec. 16, 1970, describes apparatus and method for recycling a portion of the spent reducing gas from the reduction reactor and mixing it with the reformer output. This recycling reduces the amount of the spent gas by reutilizing some of the reducing components of the recycled gas, e.g., carbon monoxide, which are desirable elements in the reducing gas. However, since the concentration of reducing components is necessarily decreased each time the gas passes through the reactor, the quality of the recycled gas tends to decrease.

In one embodiment of the present invention, the foregoing disadvantage of lowering the quality of the reducing gas is overcome by recycling a major portion of the spent reducing gas to the input of the reformer and adding a hydrocarbon gas and steam to the recycled gas before it enters the reformer. A new problem, however, arises when the spent reducing gas is recycled through the reformer in this manner. In previous systems, only steam and a hydrocarbon gas were introduced into the reformer. Therefore, by maintaining a predetermined ratio between the steam flow and hydrocarbon gas flow, almost complete reformation of the hydrocarbon gas took place and no carbon was deposited on the reformer catalyst. With the addition of the spent reducing gas to the reformer input, the problem of preventing carbon deposition in the reformer and at the same time producing a reducing gas of the desired high quality becomes more complex because of variations in the composition of the recirculated reducing gas. Accordingly, when using such a gas recycling system, a complex control problem is presented.

It is accordingly an object of the present invention to provide a method and apparatus for more effectively and efficiently producing a high quality reducing gas for use in a metal ore reduction reactor. It is another object of the invention to provide an improved apparatus and method for controlling the addition of steam to a mixture of hydrocarbon make-up gas and spent reducing gas prior to catalytic reforming of the mixture. It is a further object of the invention to provide such control while avoiding carbon deposition on the reformer catalyst. It is a still further object of the invention to provide for more efficient utilization of the hydrocarbon gas used in preparing the reducing gas. Other objects of the invention will be in part obvious and in part pointed out hereafter. In the drawings:

FIG. 1 illustrates diagrammatically a portion of a sponge iron production system wherein a stream of reducing gas is formed, utilized in a reactor, and recycled whereupon make-up gas is added and the resulting mixture is analyzed to determine the proper amount of steam required for optimum conditions;

FIG. 2 illustrates the functions performed by components of the steam control system of FIG. 1;

FIG. 3 illustrates the functions performed by the components of an alternate steam control system.

Figure 4:
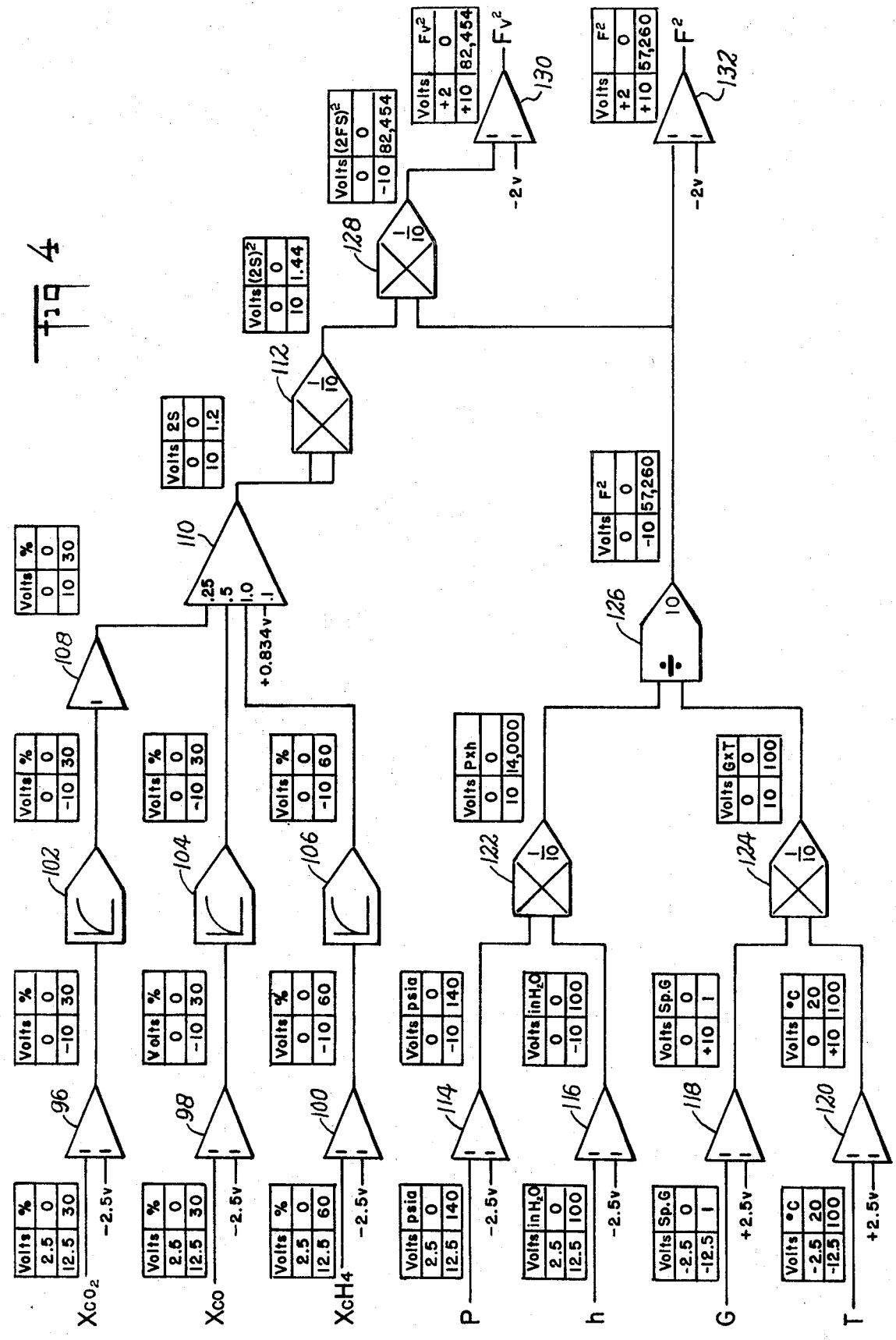
FIG. 4 shows a circuit diagram of an electronic circuit for generating a steam control signal.

Referring to FIG. 1, reducing gas is generated in a catalytic reformer 10 of a known type. In the embodiment of the reformer, shown in FIG. 1, a gas and a gas-steam mixture are preheated by being passed through coils 12 and 14, respectively, in the stack portion 16 of the reformer. The mixture of preheated gas and steam exits from coil 14 and flows through pipe 18 to a heated catalyst bed in the lower portion 20 of the reformer wherein it is converted to a gas mixture consisting largely of carbon monoxide, hydrogen and water vapor. The gas mixture then flows through pipe 22 to a quench cooler 24 wherein the gas is quenched to remove most of the water vapor therefrom. Upon leaving cooler 24, gas flows through pipe 26 and a back pressure and flow recorder controller 28 that maintains a predetermined back pressure on the reformer.

In the system shown in FIG. 1, the reducing gas is heated to the desired reducing temperature of 900° to 1,100°C. in two stages. The first stage consists of passing the gas through a coil heater 30, which may be gas fired or otherwise heated, to raise the reducing gas temperature to the order of 700° to 850°C. Since it is desired to reach a reducing temperature of the order of 900° to 1,100°C., the temperature of the reducing gas leaving heater 30 is further increased by adding a relatively small amount of air or oxygen through pipe 32 and burning a small amount of the reducing gas to raise the temperature of the mixture to the desired value. When air is used as the oxidant, it usually is desirable to preheat the air to approximately the temperature of the reducing gas with which it is mixed. Such preheating can be executed in a coil heater similar to heater 30. The addition of air or oxygen to the reducing gas may be effected, for example, as described in U. S. Pat. No. 2,900,247. The hot reducing gas, as thus prepared, flows to a plenum chamber 33 in the reactor 34.

Reactor 34 is a vertical shaft reactor having a reduction zone 35 in the upper portion thereof and a cooling zone (not shown) in the lower portion thereof. The reactor 34 is suitably heat insulated and is interiorly lined with a refractory material in a manner known in the art. Particulate ore to be treated is introduced into the reactor 34 through a charging pipe 36. The ore, in the form of either lumps or preformed pellets, flows downwardly through the reduction zone 35 where it is reduced to sponge iron by the upwardly flowing hot reducing gas from plenum chamber 33. The sponge iron, so formed, now is funnelled by an internal frustoconical baffle 37 into a conduit 38 leading to the cooling zone.

Spent reducing gas leaves the reactor through a discharge connection 40 and flows to a water-cooled quench cooler 42. Upon leaving the quench cooler 42, the major portion of the gas stream flows through pipe 44 in the recycle loop. The remaining portion of the spent reducing gas is directed through a pipe 46 and a check valve 47 to a vent stack 48 and/or directed through a pipe 50 and a check valve 51 to a combustible fuel storage. In steady state operation, it is necessary to withdraw sufficient quantities of the spent reducing gas from the recycle loop to accommodate the added steam and hydrocarbon gas. An automatic pressure controller 52 is located in pipe 46 to maintain a suitable back pressure within the reactor 34 as described in copending U.S. application Ser. No. 98,612. Pipe 44 contains a compressor 54 for circulating the reducing gas. A feedback pipe 56 containing a pressure controller 58 bypasses compressor 54 to maintain the compressor discharge pressure substantially constant. It should be noted that greatest economy is attained when a substantial part of the spent reducing gas is recycled.

Pipe 44 ends at a mixer 60 whereat natural gas, added through a pipe 62, is mixed with the spent reducing gas. A flow controller 63 is positioned in pipe 62 for regulating the flow of natural gas to mixer 60. The new mixture of gases now flows through conduit 64 wherein appropriate flow rate indicating devices 66 determine pressure, pressure differential, specific gravity and temperature of the new gas mixture. The composition of the gas also is determined by a continuous analyzer 68 as more fully described below. Both device 66 and analyzer 68 transmit information signals to a suitable electronic circuit 70 in which a steam control signal is generated. After the mixed gas is so tested, it then passes through coil 12 in stack portion 16 of reformer 10. The preheated gas exits coil 12 through pipe 72 and is mixed with steam that is provided through pipe 74. The mixture of gas and steam then passes through pipe 76 and enters preheating coil 14 in the reformer 10. A flow controller 78, activated by the steam control signal generated from electronic circuit 70, is located in pipe 74 to control the addition of steam to the gas flowing through pipe 72. The electronic circuit, associated continuous analyzer 68, and the appropriate indicating devices 66 will now be discussed in detail.

As previously discussed, the steam input to the reformer must be controlled in order to produce a high quality reducing gas and to avoid carbon deposit on the catalyst. In a typical methane reformer, the relationship between steam flow $F_v$ and methane flow $F_m$ is $F_v/F_m = 2$. In such a reformer, steam is a noncarburizing element and the methane is the carburizing element. Thus the flow rate of the noncarburizing element is usually at least twice the flow rate of the carburizing element to ensure avoidance of carbon deposit on the catalyst.

The gas leaving mixer 60 of FIG. 1 comprises $H_2$, CO, $CO_2$, $CH_4$, and $N_2$. In the reformation of methane with steam, the reaction that takes place is as follows:

$$CH_4 + H_2O \rightarrow CO + 3H_2$$

Where the gas is recycled through the reformer, the following reactions take place:

$$CH_4 + H_2O \rightarrow CO + 3H_2$$
$$CH_4 + CO_2 \rightarrow 2CO + 2H_2$$

It is known that carbon deposits are formed by methane cracking and the well-known Boudard reaction of CO to give C and $CO_2$. Therefore, in order to prevent carburization, sufficient noncarburizing elements, such as $CO_2$ and $H_2O$, must be present to combine with methane. As previously mentioned, it has been found that a suitable criterion for continuous reformer operation without forming carbon deposits is to maintain the ratio of noncarburizing to carburizing elements greater than 2 at the input to the reformer. This ratio is given by the following equation in terms of flow rate:

$$(F_{H_2O} + F_{CO_2})/(F_{CO} + F_{CH_4}) = 2$$

Of course, the ratio may be greater or less than 2 depending on the particular gas being processed.

The flow rate of $H_2O$ at the reformer inlet is the sum of the $H_2O$ present in the gas plus the flow rate of the added steam. This relationship is shown by the following equation:

$$F_{H_2O} = F_v + X_{H_2O}F$$

Similarly, the flow rates of $CO_2$, CO and $CH_4$ are:

$$F_{CO_2} = X_{CO_2}F$$
$$F_{CO} = X_{CO}F$$
$$F_{CH_4} = X_{CH_4}F$$

where:

$X_i$ = mole fraction of $i$ component $F_i$ = flow of $i$ component (lb. Mols./Hr.)

$F$ = gas flow at the reformer inlet (recirculated gas + $CH_4$ make-up) (lb. Mols./Hr.)

The control ratio R, therefore is:

$$R = F_v + X_{H_2O}F + X_{CO_2}F/F(X_{CO} + X_{CH_4})$$

Now rearranging this equation in terms of steam flow rate:

$$F_v = RF(X_{CO} + X_{CH_4}) - F(X_{CO_2} + X_{H_2O})$$

Dividing both sides of the above equation by $F$ yields:

$$F_v/F = R(X_{CO} + X_{CH_4}) - (X_{CO_2} + X_{H_2O})$$

This last equation can be rewritten as $f_vF = RS$ where $S$ is defined as:

$$S = X_{CO} + X_{CH_4} - 1/RX_{CO_2} - 1/RX_{H_2O}$$

The first two terms of the above equation for $S$ are the sum of the mole fraction of the carburizing elements. Therefore, the expression for S may be rewritten in a generalized form as follows:

$$S = \Sigma n_c X_{c.e.} - 1/RX_{CO_2} - 1/RX_{H_2O}$$

where:

$n_c$ = number of C atoms in the molecule of carburizing element $X_{c.e.}$ = mol. fraction of the carburizing element.

Generally it has been found that the average value of $X_{H_2O}$ is approximately 0.01. Therefore, assuming that this value remains constant, in order to calculate the steam flow required, three gas analyzers (one for each gas component, CO, $CO_2$, and $CH_4$) and a volumetric gas flow meter are required.

Now referring to FIG. 2 wherein the electronic circuit 70, continuous analyzer 68, and flow rate indicating devices 66 are represented. The flow rate indicating devices 66 are connected about an orifice 81 in pipe 64. These devices determine pressure differential ($h$), pressure (P), specific gravity (G), and temperature (T). Each of these measured quantities is then utilized in the following equation to determine flow rate.

$$F = K\sqrt{hP/GT}$$

The gas flow rate may also be calculated by the following relation.

$$F = KP\sqrt{h/\gamma}$$

where: $\gamma$ = specific weight. In this case, however, one of the flow rate indicating devices must be a density detector. Of course, the flow measurement also can be made with any suitable volumetric meter other than an orifice.

The gas analyzer 68 can consist of a number of continuous independent gas analyzers for determing the percentages of CO, $CO_2$, and $CH_4$ in the gas. However, if a volume of the flowing gas is delayed a sufficient period, such as by use of a delay coil 80, an intermittent cromatograph or a mass spectrometer may be used, provided that electronic circuit 70 contains sufficient storage or delay capacity for the intermittent signals.

The electronic circuit 70 may be either an appropriate circuit, such as disclosed with respect to FIG. 4, or a suitably programmed digital or analog computer. If a computer is used, the computer program is essentially equivalent to the circuit of FIG. 4 and produces the same output signal for the steam controller.

Another method for the calculation of optimum steam flow is shown in FIG. 3. This method relies on the total combustion of hydrocarbons in a gas stream to yield $CO_2$. Now assuming the gas flowing in pipe 64 is comprised of CO, $CO_2$, and $H_2O$, methane, ethane ($C_2H_6$), and propane ($C_3H_8$), a sample of the gas is withdrawn from pipe 64 by a sampling system 82 and flows through a suitable volumetric meter 84 to determine a sample flow rate ($f$). The sample is then injected into a first continuous $CO_2$ analyzer 86 in which the original $CO_2$ content of the sample is determined. After leaving analyzer 86, the sample enters a combustion chamber 88 where it is ignited to yield total combustion with an excess of air or oxygen so that the CO and the hydrocarbons are converted completely to $CO_2$. Next, the new flow rate ($f'$) is determined by a second suitable volumetric meter 90. The sample is then injected into a second $CO_2$ continuous analyzer 92 in which the total $CO_2$ content is determined. It should be noted that the sample meters have to be compensated by specific gravity because of the change in the gas composition of the sample. The specific equation for S, now becomes:

$$S = (X_{CO} + X_{CH_4} + 2X_{C_2H_6} + 3X_{C_3H_8})$$
$$- 1/RX_{CO_2} - 1/RX_{H_2O}$$

The carbon balance on each side of the combustion chamber 88 is as follows:

$$f'X_{CO_{2_T}} = fX_{CO_2} + fX_{CO} + fX_{CH_4} + 2fX_{C_2H_6} + 3fX_{C_3H_8}$$

Rearranging the preceding equation in terms of the $CO_2$ components yields:

$$f'X_{CO_{2_T}} - fX_{CO_2} = f(X_{CO} + X_{CH_4} + 2X_{C_2H_6} + 3X_{C_3H_8})$$

Now both sides of the above equation are divided by $f$ to get:

$$(X_{CO} + X_{CH_4} + 2X_{C_2H_6} + 3X_{C_3H_8}) = f'/fX_{CO_{2_T}} - X_{CO_2}$$

Substituted the right portion of this equation into the equation for S provides the following equation:

$$S = f'/fX_{CO_{2_T}} - (1 + 1/R)X_{CO_2} - 1/RX_{H_2O}$$

The equation for steam flow rate, therefore, is as follows:

$$F_v = RF(f'/fX_{CO_{2_T}} - (1 + 1/R)X_{CO_2} - 1/RX_{H_2O})$$

Referring to FIG. 4, a design for electronic circuit 70 is presented wherein the outputs of the analyzers and flow rate indicating devices are converted into a gas flow rate ($F$) signal and a steam controller signal proportional to desired steam flow rate ($F_v$).

The gas analyzer 68 provides a nonlinear input signal to circuit 70 for each gas constituent such that each signal is proportional to the percentage of a particular constituent of the gas. For example, the carbon dioxide and carbon monoxide signals vary between 2.5 and 12.5 volts for 0 percent to 30 percent concentration, respectively. Similarly, the methane signal varies between 2.5 and 12.5 volts for 0 percent to 60 percent concentration, respectively. These inputs are fed into adder units 96, 98, and 100 where each is summed with a constant bias voltage of $-2.5$ volts. The adder units also reverse the sign of each input and bias voltage such that the output of each adder unit may vary between 0 and $-10$ volts depending on the input signal level. The signals at this point are still nonlinear and therefore are converted to linear functions by nonlinear amplifiers 102, 104, and 106. Referring back to the generalized equation for S, it will be noted that the noncarburizing component $CO_2$ is of opposite sign from the carburizing components CO and $CH_4$. The $CO_2$ signal, therefore, is fed into a polarity reversal unit 108 to give the signal its proper polarity. The three signals next are combined with a constant $H_2O$ signal in an adder unit 110 to obtain a signal proportional to 2S. The 2S signal is multiplied by itself in multiplier 112 to obtain the quantity $(2S)^2$.

The indicating devices 66 produce signals proportional to pressure (P), pressure differential ($h$), specific gravity (G), and temperature (T). These signals are fed into adders 114, 116, 118, and 120, respectively. In adder units 114 and 116, the pressure and pressure differential signals are summed with biasing voltages of $-2.5$ volts. The output of adder units 114 and 116 then are multiplied together in a multiplier 122 to obtain the product $P \times h$. Similarly, the specific gravity and temperature signals are added with biasing voltages of $+2.5$ volts in adder units 118 and 120, respectively. These signals then are multiplied together in multiplier 124 to obtain the product $G \times T$. The outputs of multipliers 122 and 124 are then fed into a divider 126 which divides the $P \times h$ signal by the $G \times T$ signal and multiplies the quotient by a suitable constant ($K^2$) to yield an output signal $F^2 = K^2$ Ph/Gt. The $F^2$ signal output of divider 126 is then multiplied with the $(2\ S)^2$ output signal from multiplier 112 by multiplier 128 to obtain the term $F_v^2 = (2FS)^2$. A biasing voltage is added to the output signal of multiplier 128 at adder unit 130 to properly bias the $F_v^2$ signal for the steam controller. The output from divider 126 is also summed with a biasing voltage in adder unit 132 to obtain an output signal proportional to $F^2$.

From the foregoing description, it should be apparent that the present invention provides method and apparatus capable of achieving the objectives previously set forth at the beginning of the present specification. Reuse of the spent reducing gas provides for increased efficiency and lower production costs than has heretofore been possible. Prior methods of recirculating the reducing gas to the output of the reformer, although more efficient than methods not utilizing recirculation, produced a reducing gas of lower quality. The present invention, however, provides apparatus and method which not only increase efficiency but also produce a high quality reducing gas. Recycling the spent reducing gas through the reformer not only permits reuse of the desirable reducing gas component CO, but also provides means for reformation of the $CO_2$ in the recycled gas with $CH_4$ to form CO and H. This reformation, however, is dependent on proper control of the steam input. Such steam input must be great enough to prevent carburization but low enough to permit a large degree of reformation of the $CO_2$. The foregoing description meets this control problem by disclosing a unique system whereby the optimum flow of steam is continuously maintained thus preventing carburization while permitting a large degree of reformation of the $CO_2$.

Although illustrative embodiments of the present invention have been described herein with reference to the accompanying drawings, it is to be understood that the invention is not limited to those precise embodiments, and that various changes and modifications may be effective therein by one skilled in the art without departing from the scope or spirit of this invention.

In the claims:

1. A system for reducing particulate metal ore, with a reducing gas composed largely of carbon monoxide and hydrogen, wherein the reducing gas is caused to flow in a closed loop through the reduction zone of a reactor containing said metal ore, wherein the reducing gas reduces said metal ore, the gases effluent from said reactor being then passed through a catalytic reformer adapted to convert a hydrocarbon gas and steam into carbon monoxide and hydrogen, comprising, in combination,
   a. an inlet conduit for supplying predetermined flow of hydrocarbon gas make-up to said loop between said reactor and said reformer;
   b. a steam inlet conduit for supplying steam to said loop between said hydrocarbon gas inlet conduit and said reformer;
   c. means for measuring the gas flow in said loop between said hydrocarbon gas inlet conduit and said steam inlet conduit;
   d. means for determining the gas composition in said loop between said hydrocarbon gas inlet conduit and said steam inlet conduit;
   e. a flow controller in said steam inlet conduit;
   f. means responsive to both the measured gas flow and the measured gas composition for regulating said steam flow controller;
   g. means for supplying the resulting mixture of reactor effluent gas, steam and hydrocarbon gas to said reformer; and
   h. means for returning the effluent gas from said reformer to said reactor.

2. Apparatus as described in claim 1 wherein said gas flow measuring means comprises an orifice type device and differential pressure detector, a pressure detector, a temperature detector and a specific gravity detector.

3. Apparatus as described in claim 1 wherein said gas flow measuring means comprises an orifice type device and differential pressure detector, a pressure detector and a density detector.

4. Apparatus as described in claim 1 wherein said gas composition determining means comprises at least two gas analyzers for determining the percentages of carburizing and noncarburizing elements, respectively, in said gas.

5. Apparatus as described in claim 4 wherein, said gas composition determining means comprises three gas analyzers for determining the respective percentages of carbon monoxide, carbon dioxide and methane in said gas.

6. Apparatus as described in claim 1 wherein, said gas composition determining means comprises:
   a. means for withdrawing a sample of said gas from said loop;
   b. first means for measuring the flow of said gas sample;
   c. first means for determining the percentage of carbon dioxide in said gas sample;
   d. means for yielding total combustion of said gas sample;
   e. second means for measuring the flow of the gas sample following combustion; and
   f. second means for determining the percentage of carbon dioxide in the gas sample following combustion.

7. Apparatus as described in claim 1 wherein, said responsive means (f) comprises an electronic circuit arranged in accordance with the relation $$F_v = FR(\Sigma n_c X_{c.e.} - 1/R X_{CO_2} - 1/R X_{H_2O})$$

where $F_v$ is the flow rate of steam required, $F$ is the gas flow rate between said hydrocarbon gas inlet conduit and said steam inlet conduit, $n_c$ is the number of carbon atoms in a molecule of a carburizing element, $X_{c.e.}$ is the molecular fraction of a carburizing element, $R$ is a desired ratio of noncarburizing element flow rates to carburizing element flow rates, $X_{CO_2}$ is the molecular fraction of carbon dioxide and $X_{H_2O}$ is the molecular fraction of water vapor in said reducing gas.

8. A system for reducing particulate metal ore, with a reducing gas composed largely of carbon monoxide and hydrogen, wherein the reducing gas is caused to flow in a closed loop through the reduction zone of a reactor containing said metal ore, wherein the reducing gas reduces said metal ore, the gases effluent from said reactor being then passed through a catalytic reformer adapted to convert a hydrocarbon gas and steam into carbon monoxide and hydrogen, comprising, in combination, a. an inlet conduit for supplying a predetermined flow of hydrocarbon gas make-up to said loop between said reactor and said reformer;
b. a steam inlet conduit for supplying steam to said loop between said hydrocarbon gas inlet conduit and said reformer;
c. measuring means for continuously determining the gas flow in said loop between said hydrocarbon gas inlet conduit and said steam inlet conduit;
d. analyzing means for determining the gas composition in said loop between said hydrocarbon gas inlet conduit and said steam inlet conduit;
e. a flow controller in said steam inlet conduit;
f. electronic computer means cooperating with said analyzing means and said measuring means for deriving a signal responsive to both the measured gas flow and the analyzed gas composition for generating a regulating signal for said flow controller;
g. means for supplying the resulting mixture of reactor effluent gas, steam and hydrocarbon gas to said reformer; and
h. means for returning the effluent gas from said reformer to said reactor.

9. A system for reducing particulate metal ore, with a reducing gas composed largely of carbon monoxide and hydrogen, wherein the reducing gas is caused to flow in a closed loop through the reduction zone of a reactor containing said metal ore, wherein the reducing gas reduces said metal ore, the gases effluent from said reactor being then passed through a catalytic reformer adapted to convert a hydrocarbon gas and steam into carbon monoxide and hydrogen, comprising, in combination,
a. an inlet conduit for supplying a predetermined flow of hydrocarbon gas make-up to said loop between said reactor and said reformer;
b. a steam inlet conduit for supplying gas to said loop between said hydrocarbon gas inlet conduit and said reformer;
c. measuring means for continuously determining the gas flow in said loop between said hydrocarbon gas inlet conduit and said steam inlet conduit;
d. analyzing means for determining the gas composition in said loop between said hydrocarbon gas inlet conduit and said steam inlet conduit;
e. a flow controller in said steam inlet conduit;
f. electronic computer means cooperating with said analyzing means and said measuring means for deriving a steam flow rate signal for regulating said flow controller in accordance with the relation $$F_v = FR(\Sigma n_c X_{c.e.} - 1/R X_{CO_2} - 1/R X_{H_2O})$$ where $F_v$ is the flow rate of steam required, $F$ is the gas flow rate between said hydrocarbon gas inlet and said steam inlet, $n_c$ is the number of carbon atoms in a molecule of a carburizing element, $X_{c.e.}$ is the molecular fraction of a carburizing element, $R$ is a desired ratio of noncarburizing element flow rates to carburizing element flow rates $X_{CO_2}$ is the molecular fraction of carbon dioxide and $X_{H_2O}$ is the molecular fraction of water vapor in said reducing gas;

g. means for supplying the resulting mixture of reactor effluent gas, steam and hydrocarbon gas to said reformer; and
h. means for returning the effluent gas from said reformer to said reactor.

10. A process for reducing particulate metal ore, with a reducing gas composed largely of carbon monoxide and hydrogen, wherein the reducing gas is caused to flow in a closed loop through the reduction zone of a reactor containing said metal ore, wherein the reducing gas reduces said metal ore, the gases effluent from said reactor being then passed through a catalytic reformer adapted to convert a hydrocarbon gas and steam into carbon monoxide and hydrogen, which comprises the steps of
a. supplying a predetermined flow of a hydrocarbon make-up gas to said loop at a point between said reactor and said reformer;
b. supplying steam to said loop at a point between the point of supply of make-up gas to said loop and said reformer;
c. measuring the gas flow in said loop between said hydrocarbon gas supply point and said steam input point;
d. determining the composition of the gas in said loop between said hydrocarbon gas supply point and said steam input point;
e. regulating the flow of steam to said loop in response to variations in both the measured gas flow and the determined composition of said gas;
f. supplying the resulting mixture of reactor effluent gas, steam, and hydrocarbon gas to said reformer; and
g. causing the effluent gas from said reformer to flow back to said reactor.

11. A process for reducing particulate metal ore, with a reducing gas composed largely of carbon monoxide and hydrogen, wherein the reducing gas is caused to flow in a closed loop through the reduction zone of a reactor containing said metal ore, wherein the reducing gas reduces said metal ore, the gases effluent from said reactor being then passed through a catalytic reformer adapted to convert a hydrocarbon gas and steam into carbon monoxide and hydrogen, which comprises the steps of
a. supplying a predetermined flow of a hydrocarbon make-up gas to said loop at a point between said reactor and said reformer;
b. supplying steam to said loop at a point between the point of supply of make-up gas to said loop and said reformer;
c. determining the gas flow in said loop between said hydrocarbon gas supply point and said steam input point;
d. determining the composition of the gas in said loop between said hydrocarbon gas supply point and said steam input point;
e. electronically integrating the determinations of gas flow and gas composition to regulate the flow of steam to said loop at the value $F_v$ as determined from the equation:

$$F_v = FR(\Sigma n_c X_{c.e.} - 1/R X_{CO_2} - 1/R X_{H_2O})$$

where $F$ is the gas flow rate between said hydrocarbon gas inlet point and said steam inlet point, $n_c$ is the number of carbon atoms in a molecule of a carburizing element, $X_{c.e.}$ is the molecular fraction of a carburizing element, $R$ is a desired ratio of non-carburizing element flow rates to carburizing element flow rates, $X_{CO_2}$ is the molecular fraction of carbon dioxide and $X_{H_2O}$ is the molecular fraction of water vapor in said reducing gas;

f. supplying the resulting mixture of reactor effluent gas, steam and hydrocarbon gas to said reformer; and g. causing the effluent gas from said reformer to flow back to said reactor.

12. A process as described in claim 10 wherein, said gas composition determining (d) comprises the steps of:

a. sampling a portion of said gas;
b. measuring the flow of the sampled gas;
c. determining the percentage of carbon dioxide in the sampled gas;
d. burning said sampled gas to yield gaseous products of combustion;
e. measuring the flow of said gaseous products of combustion; and
f. determining the percentage of carbon dioxide in the gaseous products of combustion.

13. A process as described in claim 12 wherein, the flow of steam is regulated in accordance with the relation $$F_v = RF(f'/fX_{CO_2} - (1 + 1/R)X_{CO_2} - 1/RX_{H_2O})$$

where $F_v$ is the flow rate of steam required, $F$ is the gas flow rate between said hydrocarbon gas inlet and said steam inlet, $f$ is the flow of sample gas before burning, $f'$ is the flow of said gaseous products of combustion, $R$ is a desired ratio of noncarburizing element flow rates to carburizing element flow rates, $X_{CO_2}$ is the molecular fraction of carbon dioxide before burning said sample gas, $X'_{CO_2}$ is the molecular fraction of carbon dioxide in the gaseous products of combustion and $X_{H_2O}$ is the molecular fraction of water in said reducing gas.

* * * * *

UNITED STATES PATENT OFFICE
CERTIFICATE OF CORRECTION

Patent No. 3,770,421                Dated November 6, 1973

Inventor(s) Juan Celada et al.

It is certified that error appears in the above-identified patent and that said Letters Patent are hereby corrected as shown below:

In the Claims:

At the end of Column 12 of the patent, insert Claim 14 as follows:

-- 14. Apparatus as described in Claim 1 wherein said gas flow measuring means comprises a volumetric meter. --

Signed and sealed this 3rd day of December 1974.

(SEAL)
Attest:

McCOY M. GIBSON JR.          C. MARSHALL DANN
Attesting Officer             Commissioner of Patents